US007720284B2

United States Patent
Zhang et al.

(10) Patent No.: US 7,720,284 B2
(45) Date of Patent: May 18, 2010

(54) METHOD FOR OUTLINING AND ALIGNING A FACE IN FACE PROCESSING OF AN IMAGE

(75) Inventors: Li Zhang, Los Angeles, CA (US); Haizhou Ai, Beijing (CN); Shuichiro Tsukiji, Kyoto (JP); Shihong Lao, Kyoto (JP)

(73) Assignees: Omron Corporation, Kyoto (JP); Tsinghua University, Beijing (CN)

( * ) Notice: Subject to any disclaimer, the term of this patent is extended or adjusted under 35 U.S.C. 154(b) by 922 days.

(21) Appl. No.: 11/517,485

(22) Filed: Sep. 8, 2006

(65) Prior Publication Data

US 2008/0063263 A1 Mar. 13, 2008

(51) Int. Cl.
G06K 9/34 (2006.01)
(52) U.S. Cl. .................................................. 382/173
(58) Field of Classification Search ................ 382/118, 382/155–156, 159, 224, 227; 706/2, 26, 706/45, 52
See application file for complete search history.

(56) References Cited

U.S. PATENT DOCUMENTS

| | | | | |
|---|---|---|---|---|
| 5,675,663 A | * | 10/1997 | Koerner et al. | 382/181 |
| 5,842,194 A | * | 11/1998 | Arbuckle | 706/52 |
| 6,118,887 A | * | 9/2000 | Cosatto et al. | 382/103 |
| 6,879,709 B2 | * | 4/2005 | Tian et al. | 382/118 |
| 7,035,461 B2 | * | 4/2006 | Luo et al. | 382/167 |
| 7,184,578 B2 | * | 2/2007 | Simon et al. | 382/118 |
| 7,184,602 B2 | * | 2/2007 | Cohen et al. | 382/243 |
| 7,333,963 B2 | * | 2/2008 | Widrow et al. | 706/18 |
| 7,508,961 B2 | * | 3/2009 | Chen et al. | 382/118 |
| 7,551,755 B1 | * | 6/2009 | Steinberg et al. | 382/118 |

OTHER PUBLICATIONS

J. Tu, et al., "Face Localization via Hierarchical Condensation with Fisher Boosting Feature Selection", *IEEE*, 2004.
Changbo Hu, et al., "Real-time View-based Face Alignment Using Active Wavelet Networks".
P. Jonathan Phillips, et al., "The FERET Evaluation Methodology for Face-Recognition Algorithms", *IEE Transactions on Pattern Analysis and Machine Intelligence*, vol. 22, No. 10, Oct. 2000.
Martinez et al, The AR Face Database, pp. 1-6, technical report 1998.
Chang Huang, et al., "Omni-Directional Face Detection Based on Real Adaboost", Computer Science and Technology Dept. Tsinghua University, Beijing 2004.
Robert E. Schapire, et al., "Improved Boosting Algorithms Using Confidence-rated Predictions", *Machine Learning* 37(3): 397-336, 1999.

(Continued)

*Primary Examiner*—Jose L Couso
(74) *Attorney, Agent, or Firm*—Dickstein Shapiro LLP

(57) ABSTRACT

Method and apparatus for face alignment by building a hierarchical classifier network. The hierarchical classifier network connects the tasks of face detection and face alignment into a smooth coarse-to-fine procedure. Texture classifiers are trained to recognize feature texture at different scales for different resolution layers. A multi-layer structure is employed to organize the texture classifiers, which begins with one classifier at the first layer and gradually refines the localization of feature points using additional texture classifiers in subsequent layers.

34 Claims, 8 Drawing Sheets

OTHER PUBLICATIONS

Paul Viola, et al., "Rapid Object Detection Using a Boosted Cascade of Simple Features", *Accepted Conference on Computer Vision and Pattern Recognition* 2001.

Iain Matthew et al., "Active Appearance Models Revisted", The Robotics Institute, Carnegie Mellon University, 2004.

Ce Liu, et al., "Hierarchical Shape Modeling for Automatic Face Localization", 2002.

Yi Zhou, et al., "A Bayesian Mixture Model for Multi-view Face Alignment", *Proceedings of the 2005 IEEE Computer Society Conference on Computer Vision and Pattern Recognition*, 2005.

A. Hill, et al., "Active Shape Models and the Shape Approximation Problem", Dept. of Medical Bio-Physic, *British Machine Vision Conference*, 1995.

Shuicheng Yan, et al., "Ranking Prior Liklihood Distributions for Baysian Shape Localization Framework", *Proceedings of the Nine IEEE International Conference on Computer Vision*, 2003.

Bram van Ginneken et al., "Active Shape Model Segmentation With Optimal Features", *IEEE Transactions on Medical Imaging*, vol. 21, No. 8, Aug. 2002.

Li Zhang, et al., "Robust Face Alignment Based on Local Texture Classifiers", *IEEE*, 2005.

Yuanzhong Li et al, "Shape Parameter Optimization for AdaBoosted Active Shape Model", Imaging Software Technology Center, 2005.

Fei Zuo, et al., "Fast Facial Feature Extraction Using a Deformable Shape Model with Haar-Wavelet Based Local Texture Attributes", *IEEE*, 2004.

Feng Jiao, et al., "Face Alignment Using Statistical Models and Wavelet Features", *IEEE*, 2003.

T. F. Cootes et al., "Statistical Modles of Appearance for Computer Vision", Dec. 5, 2000.

P. J. Phillips et al., "The FERET database and evaluation procedure for face-recognition algorithms", Journal of Image and Vision Computing 16 (1998) p. 295-306.

\* cited by examiner

METHOD FOR OUTLINING AND ALIGNING A FACE IN FACE PROCESSING OF AN IMAGE

BACKGROUND OF THE RELATED ART

1. Field of the Invention

The present invention relates to a method and apparatus for outlining and aligning a face in face processing.

2. Description of the Related Art

Face alignment plays a fundamental role in many face processing tasks. The objective of face alignment is to localize the feature points on face images, such as the contour points of eyes, noses, mouths and outlines. The shape and texture of the feature points acquired by the alignment provide information for applications such as face recognition, modeling, and synthesis.

There have been many studies on face alignment in the recent decade, most of which were based on Active Shape Model (ASM) and Active Appearance Model (AAM) methods. In these methods, local or global texture features are employed to guide an iterative optimization of label points under the constraint of a statistical shape model.

Both ASM and AAM use a point distribution model to parameterize a face shape with a Principle Component Analysis (PCA) method. However, the feature model and optimization strategy for ASM and AAM are different. ASM introduces a two-stage iterative algorithm, which includes: 1) given the initial labels, searching for a new position for every label point in its local neighbors that best fits the corresponding local one-dimensional profile texture model; and 2) interpreting the shape parameters that best fit these new label positions. AAM is different from ASM in that it uses a global appearance model to directly conduct the optimization of shape parameters. Due to the different optimization criteria, ASM performs more accurately on shape localization, and is relatively more robust to illumination and bad initialization. However, the classical ASM method only uses a vector gradient perpendicular to the contour to represent the feature, and characterizes it with PCA. Since this one-dimensional profile texture feature and PCA are so simple, the classical ASM method may not be sufficient to distinguish feature points from their neighbors. Therefore, the classical ASM technique often suffers from local minima problem in the local searching stage.

Many different types of features, such as Gabor, Haar wavelet, and machine learning methods, such as Ada-Boosting and k-NN, have been employed to replace the gradient feature and simple gaussian model in the classical ASM methods and improve the robustness of the texture feature. Further, different methods of optimization, such as weighted least-square, statistical inference, and optical flows, have been carried out to improve the efficiency of convergence. However, these methods have not been sufficient to make face alignment with an accurate local texture model, which can be generalized to large data sets, practical for use.

Furthermore, the methods described above do not pay sufficient attention to the initialization of the alignment, which affects the performance of the alignment. Many face alignment processes begin with face detection, in which the face to be aligned is first detected. However, face detection algorithms only give a rough estimation of the position of a face region, and in many cases it may be difficult to align facial shapes starting from the rough estimation, due to the fact that face images may vary greatly due to differences in face shape, age, expression, pose, etc., which may cause errant initialization. Therefore, it may be difficult to estimate all the feature points properly in initialization. With a bad initialization, the iterative optimization of both ASM and AAM may get stuck in local minima, and the alignment may fail.

There have been efforts trying to solve face alignment using face detection techniques. Boosted classifiers, which have been widely used to recognize the face pattern, may be used to recognize smaller texture patterns for every facial feature point. See Zhang et al., "Robust Face Alignment Based on Local Texture Classifiers" in Proceedings of ICIP (2005). There has also been previous works employing hierarchical approaches. One of these methods includes a hierarchical data driven Markov chain Monte Carlo (HDDMCMC) method to deduce the inter-layer correlation. See Liu et al., "Hierarchical Shape Modeling for Automatic Face Localization" in Proceedings of ECCV (2002). Another method uses multi-frequency Gabor wavelets to characterize the texture feature. See Jiao et al., "Face Alignment Using Statistical Models and Wavelet Features" in: Proceedings of CVPR (2003). Still other methods use a multi-resolution strategy in their implementations, most of which simply take the alignment result in the low-resolution images as the initialization for high-resolution images.

SUMMARY

Embodiments of the invention provide a method and apparatus for detection and alignment by building a hierarchical classifier network and connecting face detection and face alignment into a smooth coarse-to-fine procedure. Classifiers are trained to recognize feature textures in different scales from an entire face to local feature patterns. A multi-layer structure is employed to organize the classifiers, which begins with one classifier at the first layer and gradually refines the localization of feature points by more classifiers in subsequent layers. A Bayesian framework is configured for the inference of the feature points between the layers. The boosted classifiers detects facial features discriminately from the local neighborhood, while the inference between the layers constrains the searching space.

DETAILED DESCRIPTION

In order to localize the exact position of a feature point, its texture pattern will be modeled. To make the local texture model more discriminative against non-feature texture patterns, one embodiment of the invention creates strong texture classifiers by boosting LUT (look-up table) -type weak texture classifiers. The strong texture classifier may then be capable of detecting complicated texture patterns, such as human faces and facial features. Texture classifiers are described further in U.S. patent application Ser. No. 11/003, 004 (the "'004 application"), which is incorporated by reference herein in its entirety.

Figure 1:
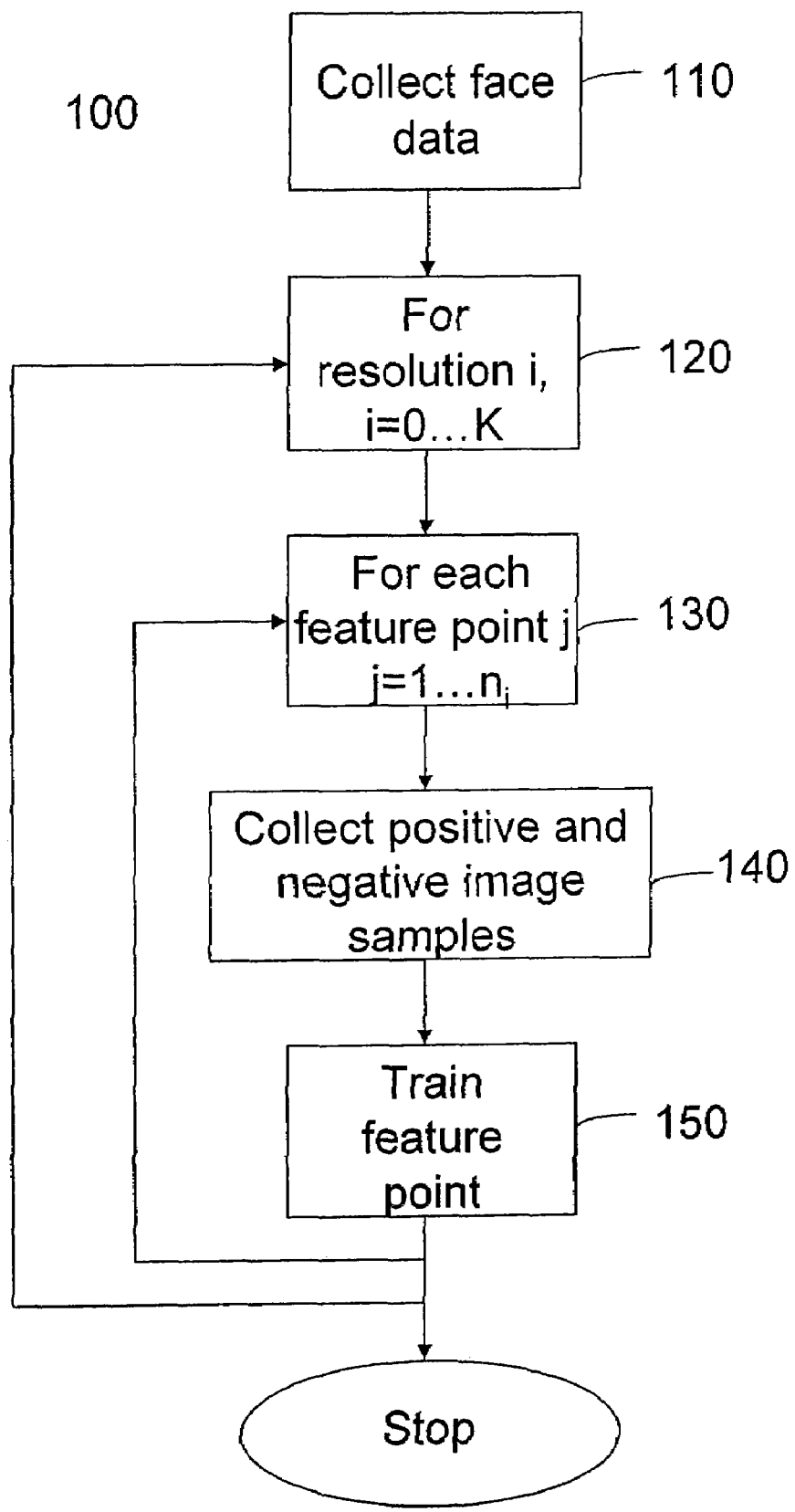
FIG. 1 shows a flowchart of a method of creating strong classifiers according to an embodiment of the invention.

FIG. 1 shows a flowchart of a method 100 for creating strong classifiers in accordance with an embodiment of the invention. The method 100 is carried out offline, (i.e., at times when face detection and alignment is not being performed) and is thus separate from the face alignment process 300 shown in FIG. 3. At step 110, face data is collected. The face data may include a number of face images of different people. The faces images may have a wide variety of features. The face images may include male and female faces over a broad range of ages from children to the elderly. The face images may also include faces with exaggerated expressions such as open mouths and/or closed eyes and may include faces with ambiguous contours. The faces may be obtained from a variety of sources, such as from database of faces or from a search of the Internet.

Integral images are made from the input images by summing the intensity values of pixels contained in a predetermined region adjacent to predefined points. The integral image allows rectangular features to be computed at any scale in constant time. A discussion of how to create and apply integral images is found in the '004 application.

At step 120, the first resolution layer (i=0) for the faces is selected. Next, at step 130, the first feature point (j=1) of the selected resolution layer is identified for the faces contained in the face data.

At step 140, positive and negative image samples are collected. A window centered on the feature point (j=1) is defined as a region of interest for the first feature point (j=1). In one embodiment, the region of interest is a [−16,16]×[−16, 16] window. Positive samples of image patches are collected from a sub-window of image points centered near or at the feature point at the center of the window. In one embodiment, a positive sample of an image patch is a [−2,2]×[−2,2] sub-window at the center of the region of interest window. Negative samples of image patches are collected from sub-windows of image points not centered on the feature point (i.e., away from the center of the window). The negative samples may be collected randomly. The positive and negative samples may be collected from each face contained in the face data. Samples need not be taken from each face image for each feature point. In one embodiment, separate sets of face images may be used to train each classifier.

A histogram approach is then used to quantify the differential values between feature areas. A success distribution of the histogram is defined as a distribution of the positive samples and the failure distribution is defined as a distribution of the negative samples. Once the histogram is created, the abscissa is segmented at specified intervals. Based on the value of the success distribution and the value of the failure distribution, a judgment value is determined for each section. A look-up table (LUT) is produced from the segmented histogram to create weak classifiers. This process is explained and illustrated in more detail in the '004 application.

Next, at step 150, using a boosting learning algorithm, sample weights are adapted to select and combine weak texture classifiers into a strong texture classifier that outputs a confidence value (Conf(x))with a very high discrimination power on the corresponding feature point using Equation 1:

$$Conf(x) = \sum_{t=1}^{T} h_t(x) - b \qquad \text{Eq. 1}$$

One boosting learning algorithm that may be used is Real-AdaBoost learning described in R. E. Schapire et. al, "Improved Boosting Algorithms Using Confidence-rated Predictions," *Machine Learning* 37, 1999, pp. 297-336. An LUT weak feature may be used as a weak classifier in the boosting learning algorithm.

Thus, a strong texture classifier $Conf_j(x)$ may be provided for the feature point (j). Given a feature pattern x, the strong texture classifier gives highly discriminative output values that can detect the corresponding feature point.

Figure 2:
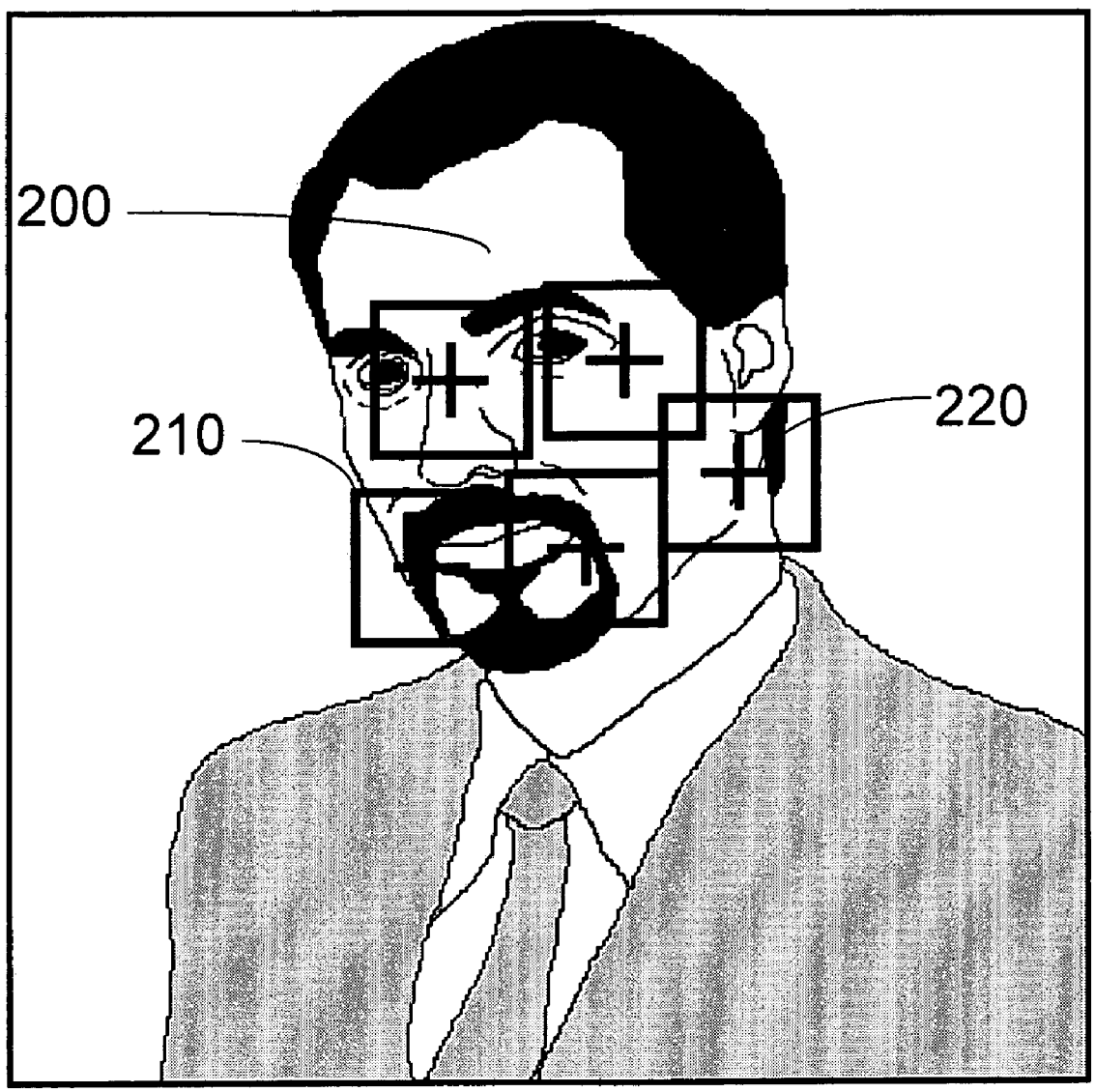
FIG. 2 shows an image of a face with rectangular texture classifiers centered on feature points.

The texture classifiers have the same rectangular shape as the positive and negative image samples because they are created from the positive and negative image samples. FIG. 2 shows an image of a face 200 with rectangular texture classifiers 210 centered on feature points 220 for a given resolution layer.

In one embodiment, the first resolution (i=0) contains only one feature point (j=1) and the strong texture classifier for the feature point j=1 is trained to detect an entire face. To achieve an even higher face detection rate, the strong texture classifier for the face may be implemented in a nested cascade structure, where each part of the cascade is more detailed than the part before it. A more detailed explanation of a nested cascade structure may be found in the '004 application, which describes the cascade as "layers" and describes texture classifiers within each layer as "face rectangles 1".

Each successive resolution layer (i.e., i=1 . . . K) after the first resolution layer may contain a larger number of feature points and should have a higher resolution than the resolution layer before it.

If the first resolution layer (i=0) contains more than one feature point (j), the process is repeated for each feature point j contained in the first resolution layer (i=0). Steps 120-150 of the process are repeated on each feature point (j) contained in each successive resolution layer (i=1 . . . . K), until a strong texture classifier is created for each feature point (j=1 . . . $N_i$) of each resolution layer (i=1 . . . K). Thus, strong texture classifiers are trained to recognize facial feature texture around feature points in different resolutions from an entire face down to specific local patterns. Additionally, a cascade of texture classifiers may be trained for each feature point j. A more detailed explanation of a cascade of texture classifiers may be found in the '004 application.

Once the texture classifiers have been trained and stored, the system is now able to perform face detection and alignment using these texture classifiers. For a large texture pattern of a feature (e.g., an entire face), an exhaustive search on the image containing the feature using a trained texture classifier may find possible candidates of the texture pattern by maximizing the likelihood output of the corresponding classifier. However, for locating smaller texture patterns of features, such as particular facial features (e.g., nose, eyes, etc.), the large image space may make exhaustive searching prohibitively time-consuming. Furthermore, the output of the texture classifiers may not be reliable in a large space.

To overcome the difficulties associated with locating smaller texture patterns of features, such as facial features, an embodiment of the invention provides a method which constrains the searching space of texture classifiers and maintains the geometry shape formed by a pre-selected group of feature points, such as a group of feature points locating features on a face. Accordingly, a shape parameter optimization stage is used to constrain the location of all the feature points in the group under a global shape model.

The task of face detection and the task of face alignment may be thought of as opposite ends of a continuum. A face detection task can explore a large image space to find the texture pattern of a face using a single texture classifier. The face detection task may display a high robustness against the complexity of the background and the variation of face texture (i.e., the face detection process can detect the face regardless of the background behind the face and regardless of the type of face). However, the detailed facial feature points may not be aligned accurately and the face localization may be rough. A face alignment task, on the other hand, may localize each facial feature point accurately, if given a good initialization as a starting point.

One embodiment of the invention provides a coarse-to-fine structure combining a face detection task and a face alignment task together to provide a hierarchical network of classifiers to align the facial shape starting from a face detection classifier. Since the texture patterns of feature points are often distinctive from their neighboring non-feature texture, locating the feature points textures can be approached as a pattern recognition task, similar to a face detection task. Considering the face detection as the coarsest texture classifier at the first layer, a hierarchical structure can be created to gradually refine the localization of feature points by more classifiers in the subsequent layers. A Bayesian framework is configured for the inference of the feature points between the resolution layers. Both the classifiers of different resolution layers and the inter-layer inference are helpful for avoiding the local-minima problems experienced by conventional methods.

Figure 3:
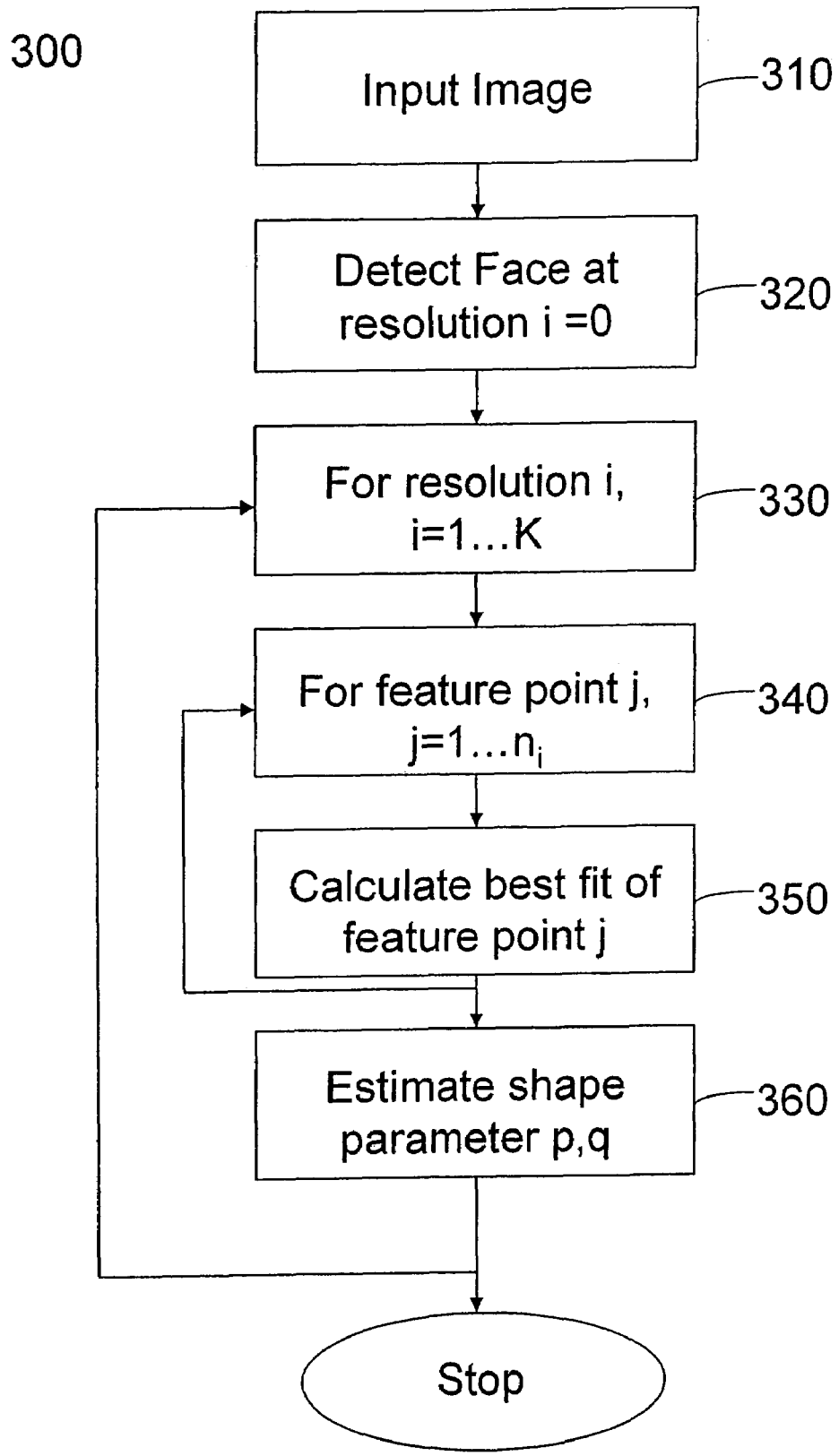
FIG. 3 shows a flowchart of a face detection and alignment method according to one embodiment of the invention.

A face detection and alignment method 300 according to one embodiment of the invention is illustrated in the flowchart shown in FIG. 3. At step 310, an image containing a face to be detected and aligned is input. The image may be input by any known means of transferring digital data. For example, the image may be input through a wireless or wired network (local area network, Internet, etc.) or, alternatively, may be input from a digital camera, a scanner, a personal computer or a recording device (such as a hard disk drive) using a standard or SCSI (Small Computer System Interface) or radio connection, such as Bluetooth. As another alternative, the image may be input from a recording medium, such as a flash memory, a floppy disk, a CD (compact disk) or DVD (digital versatile disk, or digital video disk), through an appropriate drive for reading the data from the recording medium.

Integral images are made from the input images by summing the intensity values of pixels contained in a predetermined region adjacent to predefined points to allow rectangular features to be computed at any scale in constant time. A discussion of how to create and apply integral images is found in the '004 application.

At step 320, in the first resolution layer (i=0), a previously-trained texture classifier is used to locate the central point ($x_c$, $y_c$), rotation angle $\theta$ and size W of a face. That is, the first layer (i=0) is used to detect a face in the image. The face size W is then normalized to L pixels in width, and shape/pose parameters for the first resolution layer $p^0$, $q^0$ are estimated as a face detector through a max-a-posterior (MAP) inference shown in Equation 2:

$$\arg\max_{p^0,q^0} P(x_c, y_c, \theta, W \mid p, q)P(p^0)P(q^0) \qquad \text{Eq. 2}$$

Accuracy for the subsequent face alignment process may be improved by determining the central point ($x_c$, $y_c$) using face detection.

For the subsequent resolution layers (i=1 ... K), the geometry shape formed by all of the feature points of a resolution layer are denoted by a feature point set $S^{(K)}=[x_1, y_1, \ldots, x_N, y_N]$, where K denotes the $K^{th}$ resolution layer. The geometry of the feature point set $S^{(K)}$ can be modeled by shape/pose parameters p, q, as shown in Equation 3:

$$S^{(K)}=T_q(S+U \cdot p) \qquad \text{Eq. 3}$$

where p is the parameter of the point distribution model constructed by PCA with average shape S and eigenvectors U. Tq(s) is the geometrical transformation based on parameters (such as e.g., scale, rotation, and translation).

At step 330, for subsequent resolution layers (i=1 ... K), the alignment task is further divided into several sub-tasks to locate the feature points (step 340). The feature points of the $k^{th}$ resolution layer, for example, are defined by the point set $S^{(k)}=[x_i^{(k)}, y_i^{(k)}]$, i=1 ... $n_k$. The geometry shape of the feature point set $S^{(k)}$ is modeled by the shape pose parameters $p^{(k)}$, $q^{(k)}$, as shown in Equation 4:

$$S^{(k)}=A^{(k)} \cdot T_{q^{(k)}}(S+U \cdot p^{(k)}) \qquad \text{Eq. 4}$$

Equation 4 represents the geometry shape of the feature points for the $k^{th}$ resolution layer as a linear combination of the feature points from the subsequent, $(k+1)^{th}$, resolution layer using geometry parameter $A^{(k)}$, as is described below in greater detail.

For each feature point in $S^{(k)}$, a texture classifier was trained (as explained above with reference to FIG. 1) with rectangular features having dimensions of $$\frac{L}{2^k} \times \frac{L}{2^k}$$

to distinguish a feature from a non-feature. It can therefore be seen that the texture classifier for each subsequent resolution layer will use a texture classifier with a smaller rectangular feature to locate finer facial features.

It is possible to find each feature point independently by maximizing the corresponding likelihood output of the texture classifier. However, in step 350, the modeled geometry shape of each feature point is considered along with the likelihood output of the texture classifiers, and the texture classifier search for the feature point set $S^{(k)}$ is constrained by the parameter of the shape model shown in Equation 4. By constraining the texture classifier search for the feature point set $S^{(k)}$, the feature points may be located more quickly and with better accuracy because the texture classifiers need not search the entire image or detected face.

Therefore, at step 350, to locate the feature point set and align the face for the current feature (j) in the current layer (i), the location of the feature point set $S^{(k)}$ is formulated and the shape/pose parameters $p^{(k)}$, $q^{(k)}$ are determined using both the texture in the $k^{th}$ resolution layer as searched by the texture classifiers and the shape pose parameters estimated in the previous layer $p^{(k-1)}$, $q^{(k-1)}$, by the Bayesian inference which is shown below in Equation 5:

$$p^{(k)}, q^{(k)} = \mathrm{argmax} P(S^{(k)} \mid p^{(k-1)}, q^{(k-1)}, I^{(k)}) \quad \text{Eq. 5}$$
$$= \mathrm{argmax} P(I^{(k)} \mid S^{(k)}, p^{(k-1)}, q^{(k-1)}) P(S^{(k)} \mid p^{(k-1)}, q^{(k-1)})$$
$$= \mathrm{argmax} P(I^{(k)} \mid S^{(k)}) P(S^{(k)} \mid p^{(k-1)}, q^{(k-1)})$$
$$= \mathrm{argmax} P(I^{(k)} \mid S^{(k)}) P(p^{(k-1)}, q^{(k-1)} \mid S^{(k)}) P(S^{(k)})$$

where $P(I^{(k)}|S^{(k)})$ is the posterior probability of the feature texture, which can be acquired from the output of the texture classifiers, and $p(p^{(k-1)}, q^{(k-1)}|S^{(k)})$ is the posterior probability of the parameters of previous layer.

Thus, the feature point set $S^{(k)}$ at the $k^{th}$ layer can be aligned by solving the optimization in Equation 5. The solution serves as a prior distribution $P(S^{(k+1)}|p^{(k)}, q^{(k)})$, which will be used to constrain the searching space for the feature point set $S^{(k+1)}$ for the next $((k+1)^{th})$ resolution layer.

Figure 4:
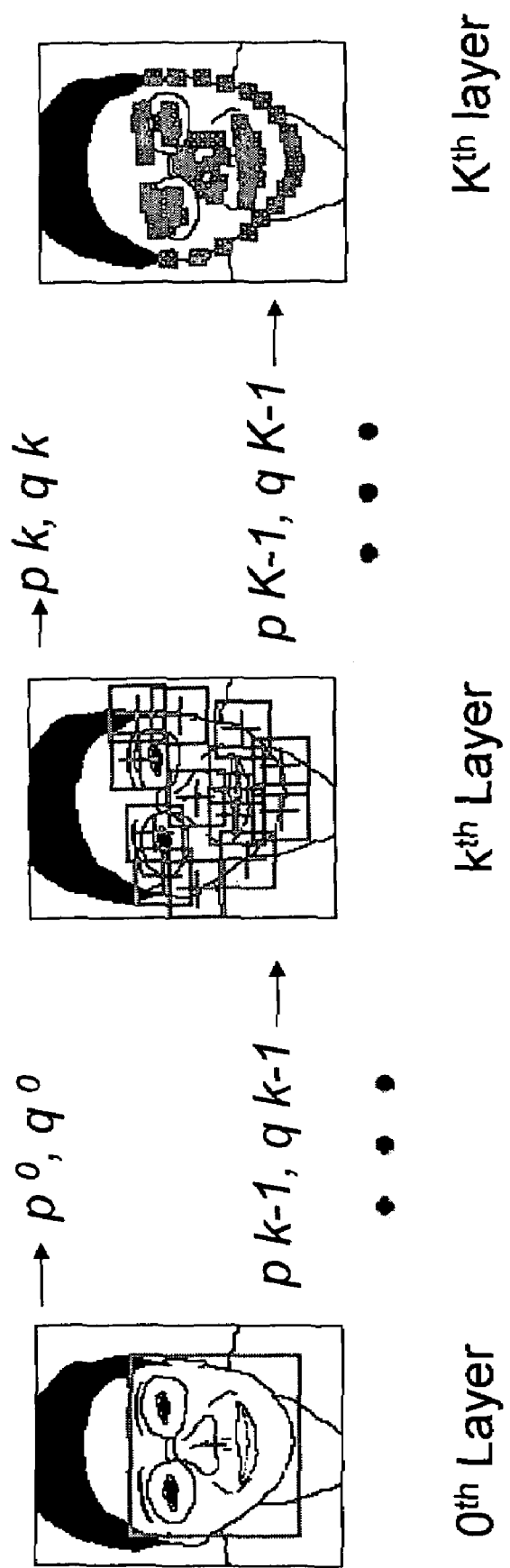
FIG. 4 shows a face with feature points outlined by rectangular texture classifiers at the $0^{th}$, $k^{th}$, and $K^{th}$ resolution layers.

FIG. 4, shows a face, according to an embodiment, with feature points shown by crosses and being outlined by rectangular texture classifiers at the $0^{th}$, $k^{th}$, and $K^{th}$ resolution layers. As shown in FIG. 4, the alignment process is repeated for the feature point set (S) in each resolution layer (i=1 ... K) using the shape/pose parameters p, q from the previous resolution layer as is also shown by the arrow leading from the end of step 360 to step 330 in FIG. 3. Each successive resolution layer refines the alignment result by using more texture classifiers having smaller rectangular features. Finally, in the $K^{th}$ layer, $p^{(K)}$ and $q^{(K)}$ are estimated by localizing all the feature points in the feature point set $S^{(K)}$ and thus the face is aligned at the finest resolution level.

It should be noted that the multiple resolution layers of the hierarchical classifier network is optional. The number of resolution layers used may be reduced to as few as one and may be increased to any number desired depending on the level of accuracy required for a specific use.

The method by which the feature point sets and their geometry are selected to get $S^{(1)}, S^{(2)}, \ldots S^{(K)}$ and $A^{(1)}, A^{(2)}, \ldots A^{(K)}$, is now described. The feature point sets for the resolution layers may be selected so that they minimize both the training error of the classifiers and the expectational error during the inference between the layers. Feature selection may be done by exhaustive searching or other approximate algorithms such as Forward/Backward algorithms.

In one embodiment, the feature selection used to generate the desired feature point sets is accomplished using a heuristic algorithm based on prior-knowledge to give an approximate solution. The feature point sets in the resolution layers of the hierarchical structure are built backwards from the feature point set of the subsequent layer, starting with the final desired feature point set $S^{(K)}$ for the final ($K^{th}$) and thus, the finest resolution layer.

For example, the feature point set of the $k^{th}$ layer may be constructed by merging feature points in the $(k+1)^{th}$ layer. In one embodiment (described below with reference to FIG. 5), the feature points in the $(k+1)^{th}$ layer are merged only if they are close enough so that the texture classifier rectangular feature of the new feature point to be created covers most of the area of the texture classifier rectangular features of the two feature points before mergence.

The feature point in the last ($K^{th}$) layer may be denoted by Equation 6 as:

$$S^{(K)} = \{x_i^{(K)}, y_i^{(K)} \mid i = 1 \ldots n_K\}, A_{i,j}^{(K)} = \begin{cases} 0 : i \neq j \\ 1 : i = j \end{cases} \quad \text{Eq. 6}$$

where the width of the face shape is L.

The method for calculating feature point set $S^{(k)}$ and its geometry parameter $A^{(k)}$ is as follows:

Step 1. $F_i = \{(x_i^{k+1}, y_i^{k+1})\}, i = 1 \ldots n_{k+1}$;

Step 2. let $d(F_i, F_j) = \max\{\|(x, y) - (u, v)\| \mid (x, y) \in F_i, (u, v) \in F_j\}$, find $i^*, j^* = \underset{F_i, F_j \neq 0, i \neq j}{\mathrm{argmin}} \{d(F_i, F_j)\}$;

Step 3. If $i^*, j^*$ exists, and $$D_{min} < \frac{L/2^k}{2},$$

let let $F_{i^*} \leftarrow F_{i^*} \cup F_{j^*}$, $F_{j^*} \leftarrow \theta$, and goto Step 2;

Step 4. Create one feature point for each nonempty Fi:

$$(x_i^k, y_i^k) \leftarrow \frac{1}{|F_i|} \sum_{(x_j, y_j) \in F_i} (x_j, y_j), \quad A^{(k)} \leftarrow \frac{1}{|F_i|} \sum_{(x_j, y_j) \in F_i} A_j^{(k+1)}$$

The hierarchical structure is constructed by applying the algorithm above from the $(K-1)^{th}$ layer back to $0^{th}$ layer.

Figure 5:
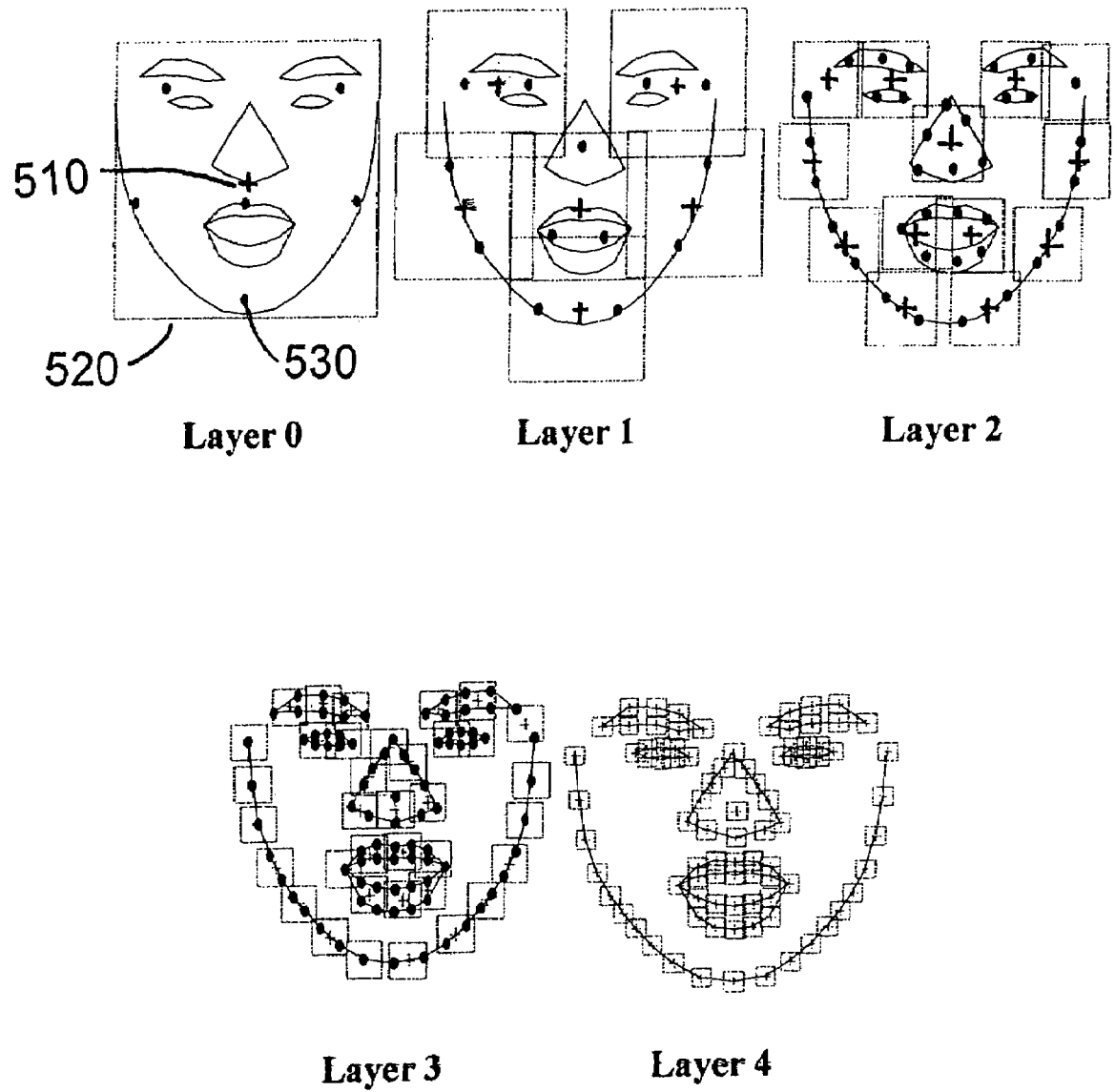
FIG. 5 shows an example of a facial feature hierarchical network that includes five resolution layers.

FIG. 5 shows an embodiment in which the facial feature hierarchical network includes five resolution layers. FIG. 5 shows the feature points 510 for each resolution layer surrounded by their respective texture classifier rectangular 520 feature. Also shown in each resolution layer are the feature points 530 of the subsequent resolution layer that were merged to create the feature points of the resolution layer. It can be seen that the texture classifiers in the sequential resolution layers progress from large to small, representing more detail of the facial features in each subsequent resolution layer. The localization of features in lower layers can benefit from the estimation of facial shape in the upper layers through the Bayesian framework discussed above.

The method by which the shape and pose parameters p, q are inferred using Equation 5 is now described. As discussed above, the alignment of the feature point set at one specific resolution layer is stated as a posterior estimation (MAP) given both the texture in the specific layer and the shape pose parameters estimated in the previous layer, whose objective function is shown in Equation 7 as:

$$\underset{p^{(k)}, q^{(k)}}{\arg\max} P(I^{(k)} \mid S^{(k)}) P(p^{(k-1)}, q^{(k-1)} \mid S^{(k)}) P(S^{(k)}) \quad \text{Eq. 7}$$

The first two terms, which are respectively the likelihood of the patches I(k) and the likelihood of parameters p(k−1), q(k−1) given the feature points S(k), can be further decomposed into independent local likelihood functions of every feature point as $P(I^{(k)}|x_j^k, y_j^k)$ and $P(p^{(k-1)}, p^{(k-1)}|x_j^k, y_j^k)$. The third term, $P(S^{(k)})$, is the prior probabilistic distribution of the geometry shape, which we can get from the PCA analysis of the shape model.

By approximating these terms by Gaussians, the optimization problem in Equation 7 can be restated in Equation 8 as:

$$\arg\min_{p^{(k)}, q^{(k)}} \sigma_1 \sum_j \left\| \begin{bmatrix} x_j^k \\ y_j^k \end{bmatrix} - \begin{bmatrix} x_j' \\ y_j' \end{bmatrix} \right\|^2 + \qquad\text{Eq. 8}$$

$$\sigma_2 \sum_j \left\| \begin{bmatrix} x_j^k \\ y_j^k \end{bmatrix} - \begin{bmatrix} x_j'' \\ y_j'' \end{bmatrix} \right\|^2 + \alpha \sum_j \left( \frac{p_j^{(k)}}{\lambda_j} \right)^2$$

where (xj, yj) are modeled by parameters p(k), q(k), as $$(x_j, y_j) = A_j^{(k)} \cdot T_{q^{(k)}} \left( \begin{bmatrix} \overline{x}_j \\ \overline{y}_j \end{bmatrix} + U_j \cdot p^{(k)} \right)$$

and (x'j, y'j) is location of the feature point maximizing the output of the $j^{th}$ feature classifier, as $$(x_j', y_j') = \arg\max\{\text{Conf}_j^{(k)}(x_j', y_j')\}$$

and (x"j, y"j) is the expectational location derived from the shape model with $p^{(k-1)}$, $q^{(k-1)}$, as $$(x_j'', y_j'') = A_j^{(k)} \cdot T_{q^{(k-1)}} \left( \begin{bmatrix} \overline{x}_j \\ \overline{y}_j \end{bmatrix} + U_j \cdot p^{(k-1)} \right)$$

Equation 8 shows that the error cost of the $j^{th}$ feature point, could be explained as a weighted combination of the inconsistence in texture and shape respectively. The first term constrains the solution by the output of the texture classifier, while the second limits the searching space by the prior parameters. The weights $\sigma_1$ and $\sigma_2$ can be estimated from the outputs of the texture classifier Confi(x, y) on this layer and previous layer.

Equation 8 can be solved efficiently by a two-step or one-step minimum least square method. Since, in a desired embodiment, (x'j, y'j) is estimated through a constrained local search, the optimization can also be calculated iteratively.

Figure 6:
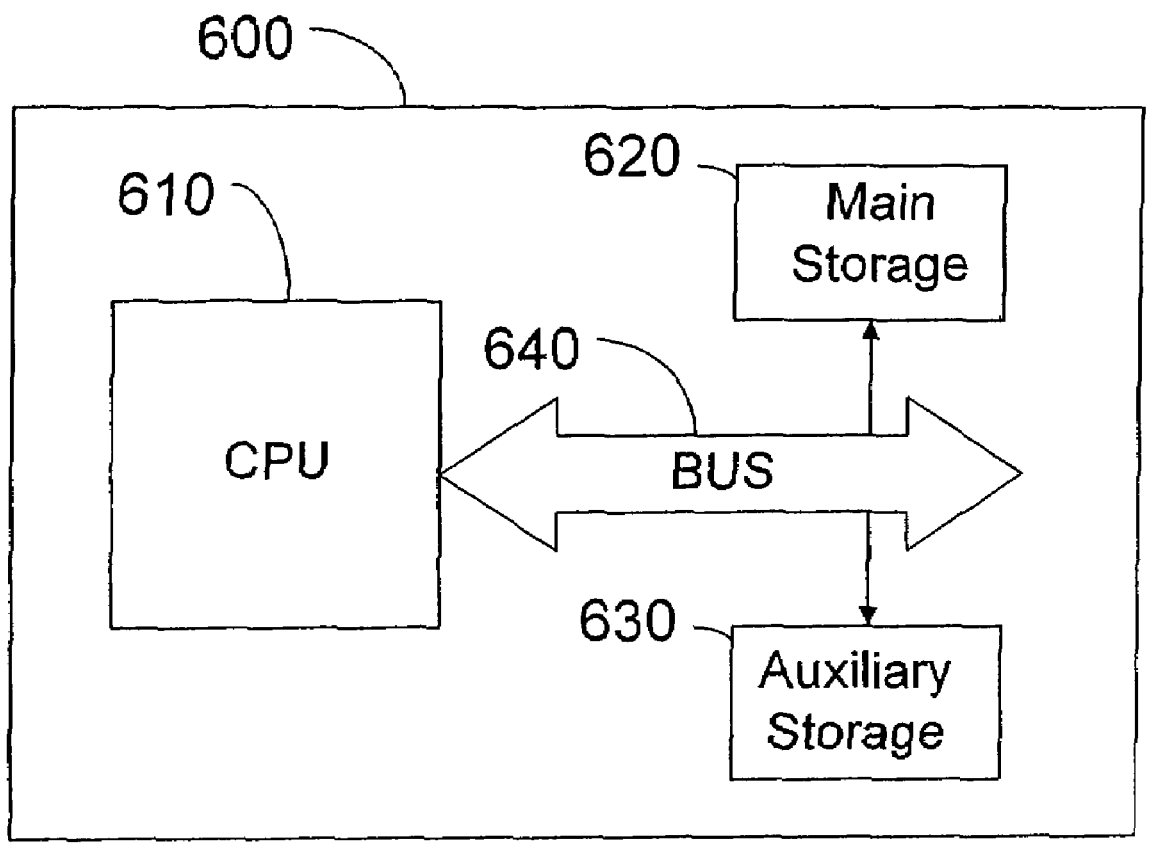
FIG. 6 shows a face detecting apparatus according to an embodiment of the invention.

A face detecting apparatus 600 according to an embodiment of the invention is shown in FIG. 6. The face detection apparatus 600 includes, in hardware, a CPU (central processing unit) 610, a main storage unit (RAM) 620, and an auxiliary storage unit 630 connected through a bus 640. The auxiliary storage unit 630 includes a nonvolatile memory. The nonvolatile memory may be a ROM (read-only memory, EPROM (erasable programmable read-only memory), EEPROM (electrically erasable programmable read-only memory), mask ROM, etc.), FRAM (ferroelectric RAM) or a hard disk drive.

The face detection device 600 may be a mobile phone, a digital camera, such as a digital still or digital video camera, an information processing device, such as a personal computer (PC), a personal data assistant (PDA), or an embedded chip, or other device that includes a CPU, RAM, and an auxiliary storage unit.

Figure 7:
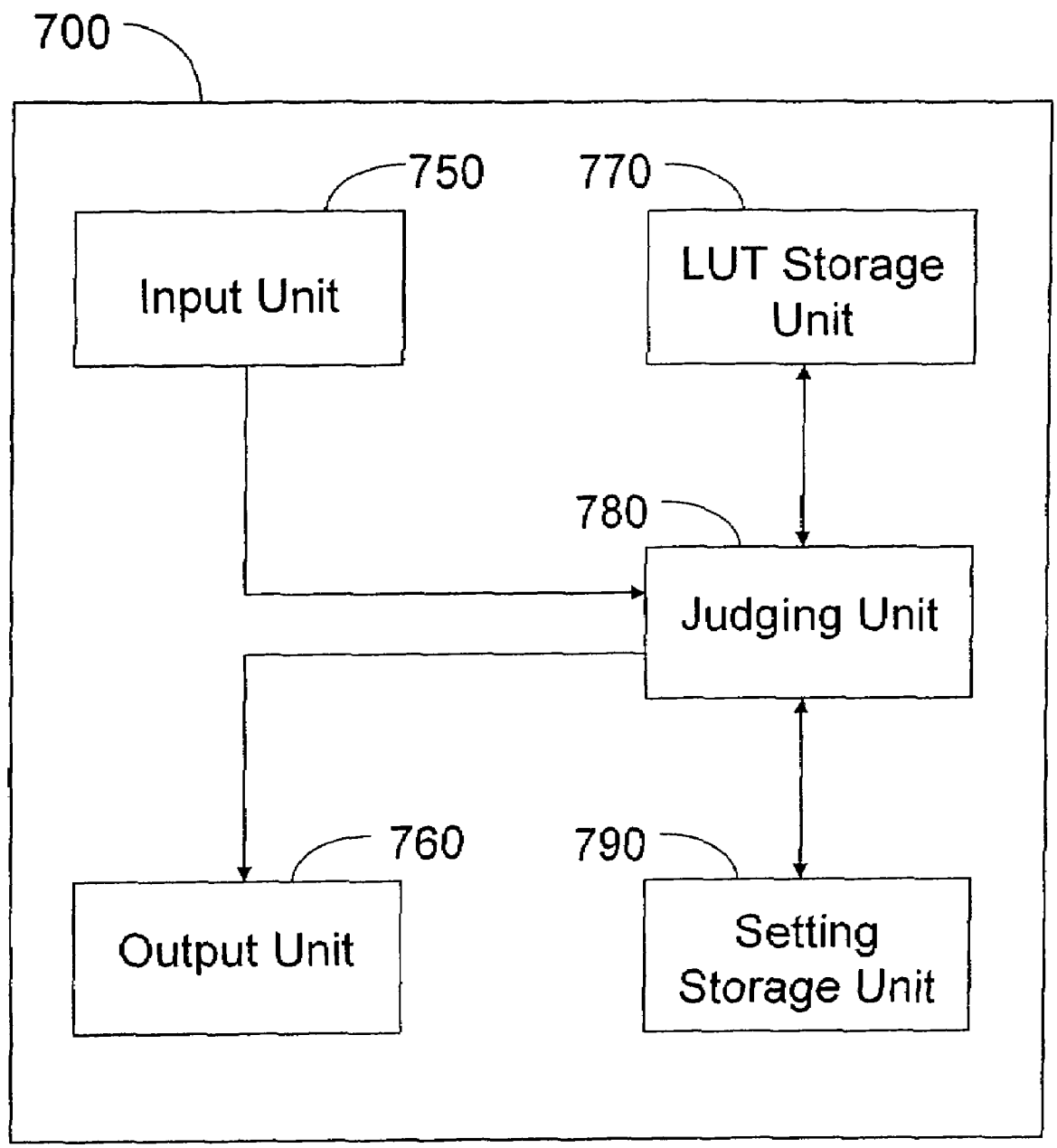
FIG. 7 shows a diagram of the functional blocks of the face detection apparatus of FIG. 6.

FIG. 7 is a diagram showing the functional blocks 700 of the face detection device 600. The functional blocks 700 of the face detection device 600 comprise an input unit 750, an output unit 760, a LUT storage unit 770, a judging unit 780, and a setting storage unit 790. With reference to FIG. 7, each functional unit of the face detection device 600 is now explained in more detail.

The input unit 750 functions as an interface for inputting the data for an original human image (hereinafter referred to as "the original image data") to the face detection device 600. The original image data may be the data of a still image or the data of a dynamic image. The original image data is input to the face detection device 600 from outside the face detection device 600 by the input unit 750. The input unit 750 may be configured using any existing technique to input the original image data to the face detection device 600.

The output unit 760 functions as an interface whereby the face alignment results are output externally of the face detection device 600. The output unit 760 may be configured using any existing technique for outputting the data on the face alignment results from the face detection device 600.

The LUT storage unit 770 is implemented as a nonvolatile memory. The LUT storage unit 770 stores a look-up table (LUT) used by the judging unit 780. Specifically, the LUT storage unit 770 stores the LUT for the texture classifier for each pattern obtained as the result of the training process 100 (FIG. 2). The LUT storage unit 770 may be store a plurality of look-up tables if desired.

The judging unit 780 executes the face detection process 200 based on the settings stored in the setting storage unit 790 using the LUT stored in the LUT storage unit 770. The judging unit 780 delivers the face detection process results to the output unit 760. The judging unit 780 inputs data from the input unit 750, the LUT storage unit 770, and the setting storage unit 790 through an input device (not shown). The judging unit 780 outputs data to the output unit 760, the LUT storage unit 770, and the setting storage unit 790 through an output device (not shown).

The judging unit 780 is realized by a CPU executing the face detection and alignment program. Also, the judging unit 780 may be configured as a dedicated chip.

Experiments were conducted on a data set including 2,000 front face images including male and female faces, ranging in age from children to elderly people. Many of the images had exaggerated expressions such as open mouths, closed eyes, or had ambiguous contours. The average face size was about 180×180 pixels. 1,600 images were randomly selected to be used for training, and the remaining 600 images were used for testing. A five resolution layer structure was implemented with one normalized face rectangle at the first layer and 87 feature points at the last layer. Each of the texture classifiers was created by AdaBoost combining 50 weak classifiers, except for the texture classifier used in the first layer for face detection. In order to achieve a higher face detection rate, the texture classifier for face detection was implemented in a nested cascade structure. A more detailed explanation of a nested cascade structure may be found in the '004 application. For comparison, classical ASM and ASM with Gabor wavelet feature methods, both with 3-layer pyramids, were implemented and trained on the same training set.

Figure 8A:
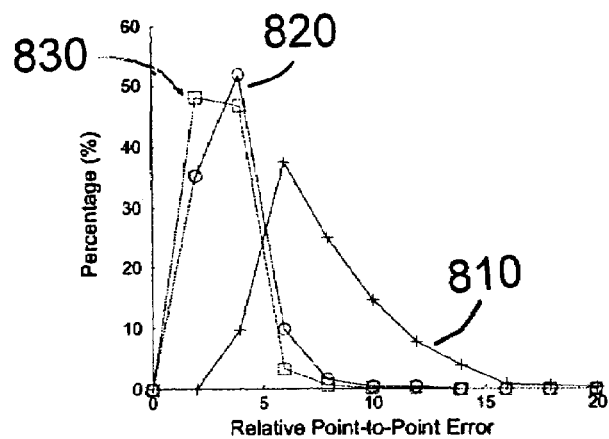
FIGS. 8a, 8b and 8c show results from testing a face detecting and aligning device according to an embodiment of the invention.
Figure 8B:
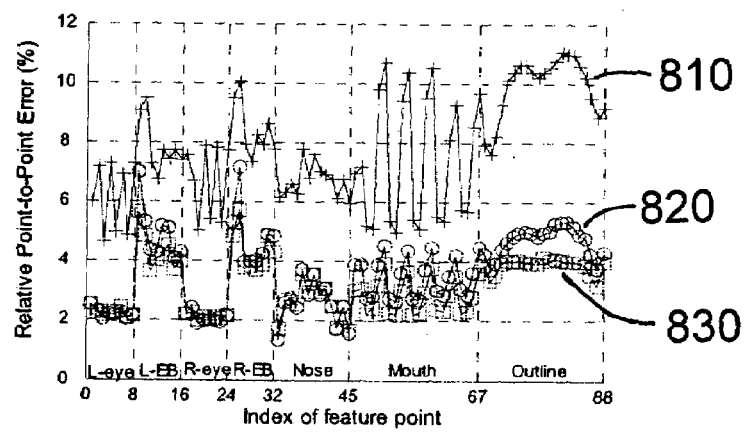

The accuracy of a particular embodiment of the invention was measured with relative point to point error, which is the point-to-point distance between the alignment result and the ground truth divided by the distance between two eyes. The feature points were initialized by a linear regression from four eye corner points and two mouth corner points of the ground truth. After the alignment procedure, the errors were measured. The distributions of the overall average error are compared in FIG. 8a for the classical ASM method 810, the Gabor method 820, and a method according to the embodiment of the invention described above 830. The average errors of the 87 feature points are compared separately in FIG. 8b. The x-coordinates, which represent the index of feature points, are grouped by organ.

Figure 8C:
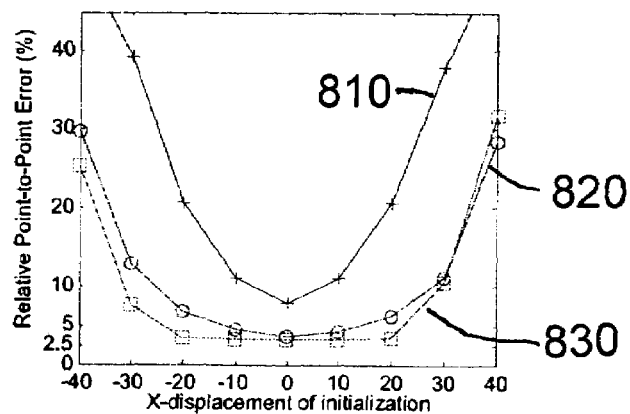

To measure the robustness of the method, in the experiment, the face detection rectangle was initialized with a −40 to 40 displacement in the x-coordinate from the ground truth when average distance between two eyes was about 87 pixels. The variation of overall average error was calculated and shown in FIG. 8c.

Additional experiments on the subsets of the well-known Purdue AR and FERET database are also carried out, which contain images that bear large expressions, such as closed eyes, big smiles, etc, and pose variation (about +/−30 rotation off-image-plane). Those images are independent of the data set used for training and testing.

The experiment results showed that the method 200 is robust against the variations. Further, the method 200 can still deal with pose changes up to a domain so far as both eyes are visible, which is approximately +/−30 degrees.

The average execution time is listed in Table 1, below. All the tests were carried out on an Intel PIV-3G PC.

TABLE 1

The average execution time per iteration (a two-stage process)

| Method | Classical ASM | Gabor | Real-AdaBoost |
|---|---|---|---|
| Time/iteration | 2 ms | 567 ms | 46 ms |

On smaller faces (100×100 pixels), the method 200 can achieve a real-time performance for desktop face video using a web camera where 6 feature points (eye/mouth corners) are manually initialized at the first frame and then on each sequential frame the labels are initialized with the alignment result of the previous frame. The program can run at a speed of about 10 frames per second, and it is relevantly robust to the variation in pose.

This process, although ideal for face detection and alignment, may be used for objects other than detection and alignment. For example, the process may also be used for displaying facial expressions in real time, such as in an avatar related program or photo-editing program. Furthermore, although the process has been described as detecting and aligning a face, the process may also be used to detect and align a wide variety of objects.

It should be apparent to those skilled in the art that the present invention may be embodied in many other specific forms without departing form the spirit or scope of the invention. Therefore, the present invention is not to be limited to the details given herein, but may be modified within the scope and equivalence of the appended claims.

What is claimed is:

1. A method of training texture classifiers to detect an object in an image, the method being preformed by a computing system and comprising:
    specifying a plurality of resolution levels for an object to be detected;
    specifying one or more feature points for each resolution level;
    collecting positive image samples from a window centered on each feature point at each resolution level from a plurality of object images;
    collecting negative image samples from windows not centered on feature points at each resolution level from a plurality of object images; and
    training a texture classifier for each feature point of each resolution level using a boosting learning algorithm.

2. The method of claim 1, further comprising using a LUT weak feature as a weak classifier in the boosting learning algorithm.

3. The method of claim 2, wherein the boosting learning algorithm is RealAdaBoost.

4. The method of claim 1, wherein the boosting learning algorithm is RealAdaBoost.

5. The method of claim 1, wherein the negative image samples are randomly collected from within a region of interest centered on each feature point.

6. The method of claim 1, wherein the number of feature points is progressively larger for each successive resolution level.

7. The method of claim 6, wherein the image samples taken are progressively smaller for each successive resolution level.

8. The method of claim 1, wherein only one feature point is specified for the first resolution level.

9. The method of claim 8, wherein the feature point specified for the first resolution level is related to at least one of an eye, nose, and mouth.

10. The method of claim 8, wherein a texture classifier trained for the one feature point of the first resolution level is trained to detect a face.

11. The method of claim 10, wherein texture classifiers trained for feature points of resolution levels subsequent to the first resolution level are trained to detect facial features.

12. The method of claim 1, further comprising training a cascade of texture classifiers for each feature point.

13. The method of claim 1, wherein a texture classifier for each feature point of each resolution level is trained using a boosting learning algorithm to boost weak classifiers constructed based on rectangular features that correspond to the positive image samples and the negative image samples.

14. The method of claim 1, wherein the feature points for a last resolution level are selected according to the final alignment desired, and wherein the feature points for the other resolution levels are constructed by merging the feature points in a subsequent resolution level.

15. The method of claim 14, wherein two feature points of a subsequent layer are merged to create a new feature point in a previous level only if they are close enough so that the texture classifier of the new feature point covers most of the area of the texture classifiers of the two feature points before mergence.

16. A method for detecting and aligning an object in an image, the method being performed by a computing system and comprising:
    locating a first feature point corresponding to the object in an image using a texture classifier at a first resolution level;
    estimating shape and pose parameters for the object at the first resolution level;
    locating a set of second feature points corresponding to features of the object using texture classifiers at a second resolution level, that is finer than the first resolution level;
    wherein search areas for the texture classifiers at the second resolution level are constrained according to the shape and pose parameters for the object at the first resolution level.

17. The method of claim 16, wherein the size of the object is normalized before estimating the shape and pose parameters for the object at the first resolution level.

18. The method of claim 16, wherein the shape and pose parameters for the object at the first resolution level are estimated using a max-a-posterior inference.

19. The method of claim 16, wherein the texture classifier at the first resolution level is implemented in a nested cascade structure.

20. The method of claim 16, wherein the second set of feature points are located using a statistical inference based on the shape and pose parameters for the object at the first resolution level and the texture classifiers at the second resolution level.

21. The method of claim 20, wherein the statistical inference is a Bayesian inference.

22. The method of claim 20, wherein solving the statistical inference yields the shape and pose parameters for the second set of feature points.

23. The method of claim 16, wherein the object is a human face.

24. The method of claim 16, further comprising:
locating multiple sets of feature points corresponding to facial features using texture classifiers, wherein the texture classifiers for each subsequent set of feature points are finer than the texture classifiers for the previous set of feature points,
wherein search areas for the texture classifiers for each subsequent set of feature points are constrained according to the shape and pose parameters for the set of feature points for the previous set of feature points.

25. A digital computing apparatus for training texture classifiers, comprising:
an image input unit for inputting a plurality of images containing an object to be detected;
a memory storage unit for storing positive image samples and negative image samples collected from the plurality of images containing the object; and
a central processing unit for training a set of texture classifiers corresponding to a set of feature points for a plurality of resolution levels of the object using a boosting learning algorithm;
wherein the positive image samples are collected by the central processing unit by specifying a plurality of resolution levels for a face, specifying a set of one or more feature points for each resolution level, and collecting positive image samples from a window centered on each feature point at each resolution level from a plurality of face images,
wherein said negative image samples are collected by the central processing unit from a window positioned away from the center on each feature point at each resolution level from a plurality of face images.

26. The digital computing apparatus of claim 25, wherein a weak classifier of the boosted learning algorithm uses an LUT weak feature.

27. The digital computing apparatus of claim 26, wherein the boosting learning algorithm used is RealAdaBoost.

28. The digital computing apparatus of claim 25, wherein the boosting learning algorithm used is RealAdaBoost.

29. A digital computing apparatus for detecting and aligning an object in an image, comprising:
an image input unit for inputting an image containing an object to be detected and aligned;
a memory storage unit for storing texture classifiers; and
a central processing unit for locating a first feature point corresponding to the object using a texture classifier at a first resolution level, estimating shape and pose parameters for the object at the first resolution level, locating a second set of feature points corresponding to features of the object using texture classifiers at a second resolution level, that is finer than the first resolution level;
wherein search areas for the texture classifiers at the second resolution level are constrained according to the shape and pose parameters for the object at the first resolution level.

30. A program encoded on a computer readable medium for training texture classifiers, said program when executed by a processor causing the processor to execute the steps of:
specifying a plurality of resolution levels for an object to be detected;
specifying one or more feature points for each resolution level;
collecting positive image samples from a window centered on each feature point at each resolution level from a plurality of object images;
collecting negative image samples from windows not centered on feature points at each resolution level from a plurality of object images; and
training a texture classifier for each feature point of each resolution level using a boosting learning algorithm.

31. The program of claim 30, wherein a weak classifier of the boosted learning algorithm uses an LUT weak feature.

32. The program of claim 31, wherein the boosting learning algorithm used is RealAdaBoost.

33. The program of claim 30, wherein the boosting learning algorithm used is RealAdaBoost.

34. A program encoded on a computer readable medium for detecting and aligning an object in an image, said program when executed by a processor causing the processor to execute the steps of:
locating a first feature point corresponding to the object in an image using a texture classifier at a first resolution level;
estimating shape and pose parameters for the object at the first resolution level;
locating a second set of feature points corresponding to features of the object using texture classifiers at a second resolution level, that is finer than the first resolution level;
wherein search areas for the texture classifiers at the second resolution level are constrained according to the shape and pose parameters for the object at the first resolution level.

* * * * *